(12) United States Patent
Hendrickson

(10) Patent No.: US 9,334,336 B2
(45) Date of Patent: May 10, 2016

(54) POLYOLEFIN REACTOR SYSTEM HAVING A GAS PHASE REACTOR AND SOLIDS RECOVERY

(71) Applicant: Chevron Phillips Chemical Company, LP, The Woodlands, TX (US)

(72) Inventor: Gregory G. Hendrickson, Kingwood, TX (US)

(73) Assignee: Chevron Phillips Chemical Company, LP, Houston, TX (US)

( * ) Notice: Subject to any disclaimer, the term of this patent is extended or adjusted under 35 U.S.C. 154(b) by 168 days.

(21) Appl. No.: 14/136,984

(22) Filed: Dec. 20, 2013

(65) Prior Publication Data

US 2015/0175721 A1 Jun. 25, 2015

(51) Int. Cl.
| | |
|---|---|
| C08F 2/34 | (2006.01) |
| C08F 6/24 | (2006.01) |
| B01J 8/18 | (2006.01) |
| B01J 8/00 | (2006.01) |
| C08F 10/00 | (2006.01) |
| G05D 16/00 | (2006.01) |

(52) U.S. Cl.
CPC . *C08F 2/34* (2013.01); *B01J 8/004* (2013.01); *B01J 8/0015* (2013.01); *B01J 8/0055* (2013.01); *B01J 8/1809* (2013.01); *B01J 8/1818* (2013.01); *B01J 2208/00752* (2013.01); *B01J 2208/00991* (2013.01)

(58) Field of Classification Search
CPC ............... C08F 2/34; C08F 6/24; B01J 8/18; B01J 8/1809; B01J 2208/00761
USPC ..................... 526/67; 422/112, 145
See application file for complete search history.

(56) References Cited

U.S. PATENT DOCUMENTS

| | | | |
|---|---|---|---|
| 4,640,963 A | 2/1987 | Kreider et al. | |
| 4,882,400 A * | 11/1989 | Dumain ................ | B01J 8/0015 526/106 |
| 5,428,118 A | 6/1995 | Painter et al. | |
| 7,816,447 B2 | 10/2010 | Lawson et al. | |
| 8,063,158 B2 | 11/2011 | Dooley et al. | |
| 8,198,384 B1 | 6/2012 | Moore et al. | |
| 2007/0025862 A1 | 2/2007 | Tice et al. | |
| 2010/0282075 A1 | 11/2010 | Force et al. | |
| 2012/0138861 A1 | 6/2012 | Liu | |

FOREIGN PATENT DOCUMENTS

| | | | |
|---|---|---|---|
| GB | 471034 | * | 8/1937 |
| WO | 03080253 | | 10/2003 |

* cited by examiner

*Primary Examiner* — Fred M Teskin
(74) *Attorney, Agent, or Firm* — Hrdlicka Chamberlain

(57) ABSTRACT

A system and method for a gas phase reactor to polymerize olefin into a polyolefin, and for a solids recovery system to separate solids from overhead gas discharged from the gas phase reactor and to return the solids to the gas phase reactor. A control system may perform a fluid flow calculation of the solids recovery system. The solids recovery system may employ a vertical motive device and/or horizontal motive device.

28 Claims, 5 Drawing Sheets

POLYOLEFIN REACTOR SYSTEM HAVING A GAS PHASE REACTOR AND SOLIDS RECOVERY

BACKGROUND

1. Field of the Invention

The present invention relates generally to a polyolefin reactor system having a gas phase reactor and, more particularly, to a reactor system employing a motive device to facilitate recovery of polymer solids from overhead gas of the gas phase reactor.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior an.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for various films, piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements such as thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "powder" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, and so forth, may affect the fluff properties.

In addition to the one or more olefin monomers, a catalyst (e.g., Ziegler-Natta, metallocene, chromium-based, post-metallocene, nickel, etc.) for facilitating the polymerization of the monomers may be added to the reactor. For example, the catalyst may be a particle added via a reactor feed stream or recycle stream and, once added, suspended in the fluid medium within the reactor. Unlike the monomers, catalysts are generally not consumed in the polymerization reaction. Further, as appreciated by the skilled artisan, the catalyst particle morphology may be supported or unsupported.

The polymerization may be performed in a single reactor or in multiple reactors in series and/or parallel. For example, one or more loop slurry (liquid phase) reactors, one or more gas phase (e.g., fluidized bed) reactors, or combinations of loop slurry reactors and gas phase may be employed. The product discharge of the reactor or terminal reactor generally has the desired polymer polyolefin fluff and may be further processed to deactivate residual catalyst and remove non-polymer components. The polyolefin fluff may be sent to the customer in a non-pelletized form, or pelletized in an extruder and sent to the customer in pellet form.

In the case of a fluidized-bed gas phase reactor to polymerize olefin into polyolefin, the carryover of polyolefin solids (typically primarily polymer fines) in the reactor overhead system can be problematic. Indeed, the presence of polymer fines over time can result in fouling or plugging of the reactor overhead system (including the solids recovery system having a separation vessel and motive device), causing an unplanned shutdown of the reactor system, resulting in loss polyolefin production and increased maintenance costs.

SUMMARY OF THE INVENTION

An aspect of the invention relates to a method of operating a reactor system having a gas phase reactor, the method including: polymerizing olefin in the gas phase reactor into a polyolefin; discharging a discharge mixture from the gas phase reactor, the discharge mixture having gas and entrained solids from the gas phase reactor; separating the entrained solids from the discharge mixture via a solids recovery system; measuring a pressure of a motive fluid supply to the solids recovery system; calculating a pressure drop in the solids recovery system; and adjusting the motive fluid supply in response to the measured pressure and the calculated pressure drop.

Another aspect of the invention relates to a method of operating a gas phase reactor, the method including: polymerizing olefin in the gas phase reactor into a polyolefin; discharging a discharge mixture from the gas phase reactor, the discharge mixture comprising an overhead gas and entrained solids from the gas phase reactor; and separating the solids from the overhead gas via a solids recovery system comprising a separation vessel and a vertical motive device.

Yet another aspect of the invention relates to a polyolefin reactor system including: a gas phase reactor to polymerize olefin into a polyolefin; a solids recovery system configured to separate entrained solids from overhead gas discharged from the gas phase reactor, wherein the solids recovery system includes a separation vessel, a motive device, and a pressure device to measure the pressure of a motive fluid supply to the motive device; and a control system to calculate a pressure drop in the solids recovery system and to adjust operation of the motive fluid supply in response to the measured pressure and the calculated pressure drop.

Yet another aspect of the invention relates to a polyolefin reactor system including: a gas phase reactor to polymerize olefin into a polyolefin; and a solids recovery system to separate entrained solids from overhead gas discharged from the gas phase reactor and to return the solids to the gas phase reactor, the solids recovery system having a separation vessel and a motive device that is substantially vertical.

BRIEF DESCRIPTION OF THE DRAWINGS

Advantages of the invention may become apparent to one of skill in the art upon reading the following detailed description and upon reference to the drawings in which.

DETAILED DESCRIPTION OF SPECIFIC EMBODIMENTS

Figure 1:
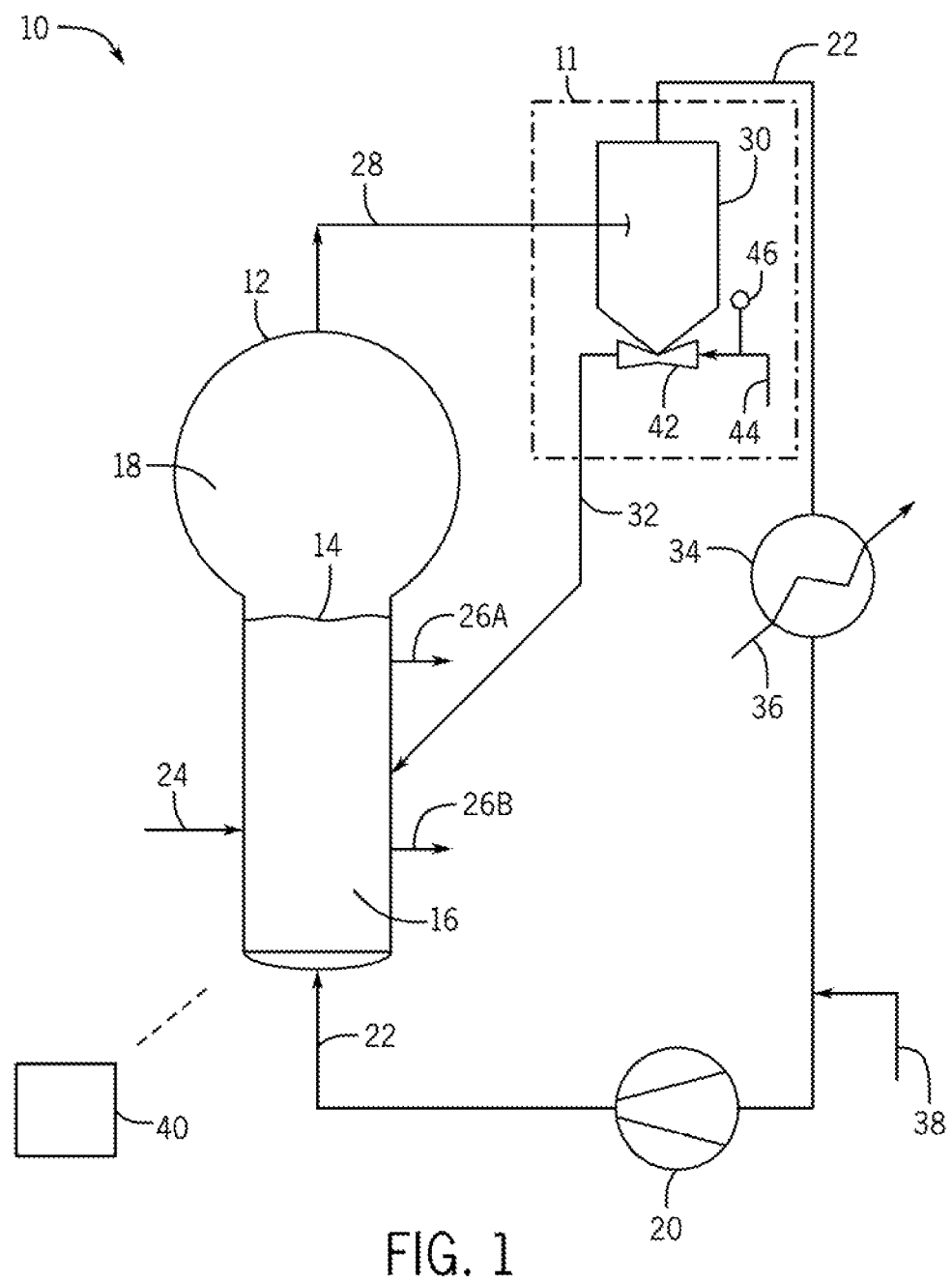
FIG. 1 is a simplified process flow diagram depicting an exemplary gas phase reactor system for polymerizing olefin into polyolefin in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Embodiments of the present techniques are directed to polymer solids recovery from the overhead stream of a gas phase reactor and may include a control system performing fluid flow calculations (e.g., pressure drop calculations) of the solids recovery system. Polymer solids are generally entrained from the gas phase reactor in the fluidization gas discharging overhead from the gas phase reactor. To address this carryover, a solids recovery system separates the polymer solids from the fluidization (loop) gas and returns the polymer solids to the gas phase reactor. In particular, the solids recovery system includes a separation vessel (e.g., cyclone) that separates the polymer solids from the discharged gas. A motive device and solids return conduit facilitate return of the polymer solids to the gas phase reactor. Further, the gas discharging from the solids recovery system may be recirculated to the reactor in a loop gas circuit, for example.

Embodiments include techniques to operate a solids recovery system having a separation vessel, motive device, and motive fluid supply. A motive device (e.g., eductor or ejector) disposed at the bottom discharge of the separation vessel facilitates return of the polymer solids from the separation vessel to the gas phase reactor. As discussed below, pressure indicators and control system calculations and adjustments may be implemented to maintain motive fluid pressure across the motive device to reduce fouling or plugging of the motive device. Further, a unique vertical eductor may reduce fouling or plugging. In all, maintenance costs, downtime of the gas phase reactor, and lost polymer production may be reduced.

In embodiments, of particular interest with respect to the fluid flow calculations may be to calculate the pressure drop of the motive fluid supply across an internal nozzle (or converging section) of the motive device. This calculated pressure drop value combined with a measured pressure value of upstream motive fluid supply, for example, may give the pressure value at the discharge of the nozzle (or converging section) which may be a suction pressure of the motive device.

This determined suction pressure value of the motive device may then be compared, for instance, to the bottom discharge pressure of the separation vessel (e.g., disposed above the motive device) to give the differential pressure between the separation vessel and the motive device. This differential pressure may be a driving force for flow of solids from the bottom of the separation vessel into the suction chamber of the motive device. An adequate value of this differential pressure is generally desired to promote flow of solids from the separation vessel into and through the motive device. This desired adequate pressure differential and flow of solids may reduce fouling or plugging of the bottom solids discharge of the separation vessel, and in the suction chamber and annulus around the nozzle of the motive device. This adequate pressure differential may be advanced by lowering the suction pressure of the motive device such as by increasing the motive fluid supply flow rate or pressure in certain examples.

I. Reactor System Overview

A polymerization reactor system may have at least one gas phase reactor. Such systems may employ a continuous recycle stream (loop gas) containing one or more monomers continuously cycled through a fluidized bed in the presence of the catalyst under polymerization conditions in the reactor. The recycle stream may be withdrawn from the fluidized bed and recycled back into the reactor. Simultaneously, polyolefin polymer product may be withdrawn from the reactor and new or fresh monomer may be added to replace the polymerized monomer. Further, more than one gas phase reactor and/or liquid-phase reactors may be employed in a polymerization reactor system, operated in series or parallel.

A fluidized-bed gas phase reactor for polyolefin production may generally have a reaction zone and a disengagement zone. In examples, the reaction zone has a height-to-diameter ratio of about 3-7.5 and the disengagement zone may have a height-to-diameter ratio of about 1-2. Of course, gas phase reactors having other diameter-to-height-to-diameter ratios for the reaction zone and disengagement zone may be employed.

To maintain a viable fluidized bed (of polyolefin particles and catalyst), superficial flow through the bed may be about 2-6 times the minimum flow for fluidization. It is generally beneficial that the bed contain polymer particles (as opposed to only catalyst, for example) to reduce the formation of localized "hot spots" and to entrap and distribute the typically powdery catalyst.

On startup of the reactor, the reaction zone may be generally charged with a base of polymer particles before gas flow is initiated. Monomer (e.g., ethylene gas) may be fed to a compressor inlet for introduction and recirculation through the reactor. Comonomer (e.g., alpha-olefin comonomer such as 1-butene or 1-hexene or 1-octene) may be added via the compressor or directly to a reactor inlet. The catalyst may be stored in a catalyst feed vessel under an inert gas (e.g., under a nitrogen blanket) and added to the reactor. In all, fluidization in the reactor may be achieved by a relatively high rate of gas recycle via a compressor to and through the bed, typically in the order of about up to 50 times or greater than the rate of feed of make-up gas. The pressure drop through the bed may be generally on the order of about 0.1-0.15 pound per square inch (psi) per foot of bed height, for example. In certain examples, a gas analyzer, positioned above the bed on the reactor or recycle stream, determines the composition of the gas being recycled. In response to the measured recycled-gas composition, the make-up gas composition may be adjusted accordingly to maintain an essentially steady-state gaseous composition with the reaction zone.

Operating conditions and processes of gas phase reactors can produce fines within a gas phase polymerization unit. Fines produced with the process are generally carried into the upper section of the reactor. Some fines exit the reactor through the main loop gas piping overhead while other fines settle on the reactor dome walls. A certain percentage of fines that exit the reactor may be captured via cyclones, for example, and transferred back into the reactor fluidized bed via a motive gas stream flowing through an ejector or eductor located at the bottom of the cyclone cone section.

This solids (fines) recovery system may not collect all of the fines carried overhead. Consequently, an increase in fines may impact downstream equipment such as downstream heat exchangers which may need frequent cleaning (of the exchangers), resulting in a reactor shutdown. An increase in fines that exceeds beyond the removal and displacement capability of the overhead cyclone recovery system may result in the plugging of a cyclone and/or fouling of the downstream shell-and-tube cooler, for example, either causing a reactor shutdown. Further, fouling or plugging of the motive device that returns recovered fines to the gas phase reactor can cause a shutdown of the reactor system. Such shutdowns can run into several days of loss production and associated maintenance costs. The present techniques may involve features of the solids recovery system to reduce the occurrence of the foregoing adverse event.

FIG. 1 is a gas-phase reactor system 10 for polyolefin production. As discussed below, the reactor system 10 has an overhead solids recovery system 11. The reactor system 10 includes a gas phase reactor 12 configured to operate with a fluidized bed 14 of polyolefin particles and a relatively small amount of catalyst particles. The polyolefin particles may generally grow in size as the polymerization proceeds. The gas phase reactor 12 has a reaction zone 16 and a disengagement zone 18. The fluidized bed 14 is generally formed in the reaction zone 16. Fluidization gas generally disengages from the solid particles in the disengagement zone 18.

As mentioned, the reaction zone 16 may have an exemplary height-to-diameter ratio of about 3-7.5 and the disengagement zone 18 may have an exemplary height-to-diameter ratio of about 1-2. A gas phase reactor 12 having other height-to-diameter ratios for the reaction zone 16 and disengagement zone 18 may be employed. The particular dimensions of the reactor zone 16 and disengagement zone 18 may impact residence time in the reactor 12.

A loop gas compressor 20 provides a loop gas 22 as the fluidization gas to the reactor 12. The loop gas 22 also facilitates heat removal generated in the polymerization reactor. The loop gas 22 may enter a bottom portion of the reactor 12 via one or more inlets to provide for fluidization of the fluidized bed 14 The loop gas 22 may flow through and/or around one or more internals (not shown) inside the reactor 12 and facilitate formation and maintaining of the fluidized bed 14.

Further, the entering loop gas 22 may generally contain the reactants (e.g., monomer and comonomer) for the polymerization. The loop gas 22 may include an inert gas (e.g., nitrogen), monomer (e.g., ethylene, propylene, etc.), any comonomer, and optionally condensable components (e.g., n-pentane). Examples of comonomer include 1-hexene or 1-butene in polyethylene production, ethylene in polypropylene production, and so forth.

In the reactor 12, the monomer and any comonomer are polymerized into a polyolefin. Catalyst 24 is added to the reactor 12 to facilitate the polymerization. An inert gas (e.g., nitrogen) supply pressure may drive addition of the catalyst 24 to the reactor 12. Examples of catalysts include Ziegler-Natta, metallocene, chromium-based, post-metallocene, nickel, unsupported catalysts, supported catalysts, and so forth. In addition to or in lieu of the catalyst 24 addition, a stream (not shown) of polyolefin particles having residual active catalyst may be added from an upstream polymerization reactor (e.g., another gas phase reactor, a loop reactor, a pre-polymerization reactor, etc.) to the reactor 12 for further polymerization in the reactor 12. Further, cocatalyst may be added to increase the rate of polymerization.

Polyolefin product particles are removed from the reactor 12 via one or more product take-offs 26A, 26B which each may employ a lock hopper configuration, for example. In the illustrated embodiment, an upper product take-off 26A is disposed to remove polyolefin from an upper portion of the fluidized bed 14, and a lower product take-off 26B is disposed to remove polyolefin from a lower portion of the fluidized bed 14. More or less than two product-takeoffs may be employed.

As mentioned, the fluidization gas (loop gas) disengages from the solid polyolefin in the disengagement zone 18. A discharged mixture 28 of the loop gas and entrained polyolefin solids exit overhead from the gas-phase reactor 12. These entrained solids are primarily typically of a relatively small particle diameter, i.e., polymer "fines." The discharged mixture 28 enters the solids recovery system 11 having one or more separation vessels 30 where loop gas 22 exits overhead from the separation vessel(s) 30. The solids (e.g., fines) discharge from the bottom of the separation vessel(s) 30 and are returned to reactor 12 in a returned mixture 32 of solids and motive gas, as discussed below. The returned mixture 32 may also include any residual loop gas from the separation vessel 30 that entered the motive device 42 with the solids from the bottom portion of the separation vessel 30. In the illustrated embodiment, the separation vessel 30 is a cyclone.

The loop gas 22 exiting overhead from the separation vessel 30 may be routed through a heat exchanger 34 (e.g., a shell-and-tube heat exchanger) to cool the loop gas 22 and remove the heat of polymerization from the loop gas 22. The cooling medium 36 on the utility side of the heat exchanger 34 may be water such as treated water or cooling tower water, or a cooling medium other than water.

Some components (e.g., i-pentane or n-pentane) in the loop gas 22 may be condensed via the heat exchanger 34, and the condensed components or condensate separated from the loop gas and returned via a pump (not shown) to the reactor 12. The condensate may vaporize in the reactor 12 providing for latent heat removal. In alternate embodiments, the heat exchanger 34 may be disposed downstream of the compressor 20.

The compressor 20 drives the cooled loop gas 22 to the bottom portion of the reactor 12. One or more makeup streams 38 may be added to the circulating loop gas 22 or directly to the reactor 12. The makeup streams 38 may include monomer, comonomer, inert gas, and so forth. Typically, the makeup streams 38 include monomer (and comonomer if used) to replace the monomer (and comonomer) consumed in the polymerization in the reactor 12. An online gas analyzer (not shown) may be disposed to measure the composition of the loop gas 22 in the circuit (e.g., such as in the overhead stream from the cyclone 30). In response to the measured composition of the loop gas 22, the amount of each component added in the makeup streams 38 may be adjusted to give or maintain a composition of the loop gas 22 and to facilitate the desired polymerization conditions in the reactor 12.

The calculations and operating adjustments discussed herein (including those discussed below with respect to the solids recovery system 11) may be implemented with a control system 40. The control system 40 may perform calculations and, along with control valves, compressors, and other process equipment, facilitate control of process variables in the polyolefin reactor system 10, automatically and/or manually, and so on. In general, a control system 40, such as a processor-based system, may facilitate management of a range of operations in the reactor system 10, such as those represented in FIG. 1.

Polyolefin manufacturing facilities may include a central control room or location, as well as a central control system, such as a distributed control system (DCS) and/or programmable logic controller (PLC). The reactor system 10 typically employs a control system 40 that is a processor-based system, such as a DCS, and may also employ advanced process control known in the art. Other operations of the polyolefin manufacturing facility may also be controlled via the control system 40 comprising a DCS (or PLC). In the control system 40, computer-readable media may store control executable code to be executed by associated processors including central processing units, and the like. Such code executable by the processor(s) may include logic to facilitate the operations described herein.

In fact, the control system 40 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system 40 where the measured data may be read by an operator and/or used as an input in various control functions or calculations by the control system 40. Depending on the application and other factors, indication of the process variables may be read locally or remotely by an operator, and/or used for a variety of control purposes via the control system 40.

The control system 40 may be wired and/or wireless, and offer the advantage of centralized control, while retaining the capability of distributed or local control. Components may include instrumentation, remote transmitters, remote control panels (e.g., remote transmission units or RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system 40 on the other. Moreover, as indicated, the control system 40 typically includes hardware/software for control, interface, database management, and so on. In operation, the control system 40 may transfer data and commands using communication protocols such as Ethernet or other open standards, or a proprietary standard, depending upon the DCS vendor, for example.

A polyolefin manufacturing facility typically has a control room from which the plant manager, engineer, technician, supervisor and/or operator, and so on, monitors and controls the process. When using a DCS control system 40, the control room may be the center of activity, facilitating the effective monitoring and control of the process or facility. The control room and DCS control system 40 may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

II. Overhead Solids Recovery

The exemplary solids recovery system 11 (e.g., a fines recovery system) removes and recovers solids (e.g., fines and larger particles) from the discharged mixture 28 (loop gas/solids) exiting overhead from the gas phase reactor 12. The solids recovery system 11 includes a separation vessel 30 (e.g., cyclone, separation pot, or other type of separation vessel).

The recovery system 11 also includes a motive device 42 (e.g., ejector, eductor, injector, jet pump, etc.) and a supply of motive fluid 44 (e.g., a slip stream of loop gas or a dedicated gas such as nitrogen). The motive device 42 and motive fluid 44 may facilitate the return and introduction of the fines (in return mixture 32) to the reactor 12 from the separation vessel 30. The return mixture 32 entering the reactor 12 may include, along with solids (fines), the motive fluid 44 from the motive device 42 and any residual loop gas from the separation vessel 30.

If an ejector (or eductor) is used as the motive device 42, it may be a type of pump that uses the venturi effect of a converging nozzle to convert the pressure energy of the motive fluid 44 to velocity energy. This velocity energy generally creates a low pressure zone that draws in and entrains the solids (fines) discharging from the bottom portion of the separation vessel 30. The motive fluid 44, mixes with the fines (and any residual loop gas) exiting separation vessel 30 in the motive device 42 and expands after passing through the throat and diverging section of the motive device 42 (ejector in this example) to reduce velocity and recompress the motive fluid 44 (with the solids) by converting velocity energy back into pressure energy.

This above characterization of the motive device 42 (e.g., ejector) operation is not meant to limit the present techniques. Other characterizations of an ejector or eductor operation are applicable. Generally, it is desirable to have a low pressure point in the motive device 42 to draw the solids from the separation vessel 30 into the motive device 42. Such may be facilitated by having adequate flow rate, velocity, and pressure of the motive fluid 44 entering the motive device 42.

In accordance with embodiments of the present techniques, a pressure device 46 may measure and indicate pressure of the motive fluid 44 supplied to the motive device 42. The pressure device 46 generally has a pressure sensor and may be disposed on the motive fluid 44 supply conduit upstream of and near the motive device 42, for example. The pressure device 46 may be a pressure gauge (local indicator) and/or include a transmitter to supply a signal indicating pressure to the control system 40 and/or to a local control system (e.g., PLC).

In certain embodiments, the pressure indication provided by pressure device 46 is utilized to manage supply pressure of the motive fluid 44 to give adequate driving force across the motive device 42. A fluid flow (e.g., pressure drop) calculation is performed (e.g., implemented via control system 40) to determine a desired supply pressure of the motive fluid 44 to give acceptable operation of the motive device 42. This calculated desired supply pressure is compared to the actual approximate supply pressure measured by the pressure device 46. If the measured pressure is too low or too high, the supply pressure of the motive fluid 44 may be adjusted to give acceptable driving force. Such may advance suction of solids from the separation vessel 30, as well as promote the downstream discharge of the solids from the motive device 42 to the reactor 12 via return mixture 32. Thus, fouling or plugging of the motive device 42 and the separation vessel 30 solids outlet may be reduced. Moreover, in addition to or in lieu of adjusting supply pressure, the flow rate of the motive fluid 44 supply may be adjusted to give acceptable operation of and driving force across the motive device 42 (and thus reduce fouling or plugging). The flow rate of the motive fluid 44 supply may be related to the calculated pressure drop. Moreover, the pressure drop calculation may be compensated for temperature and pressure.

Figure 2:
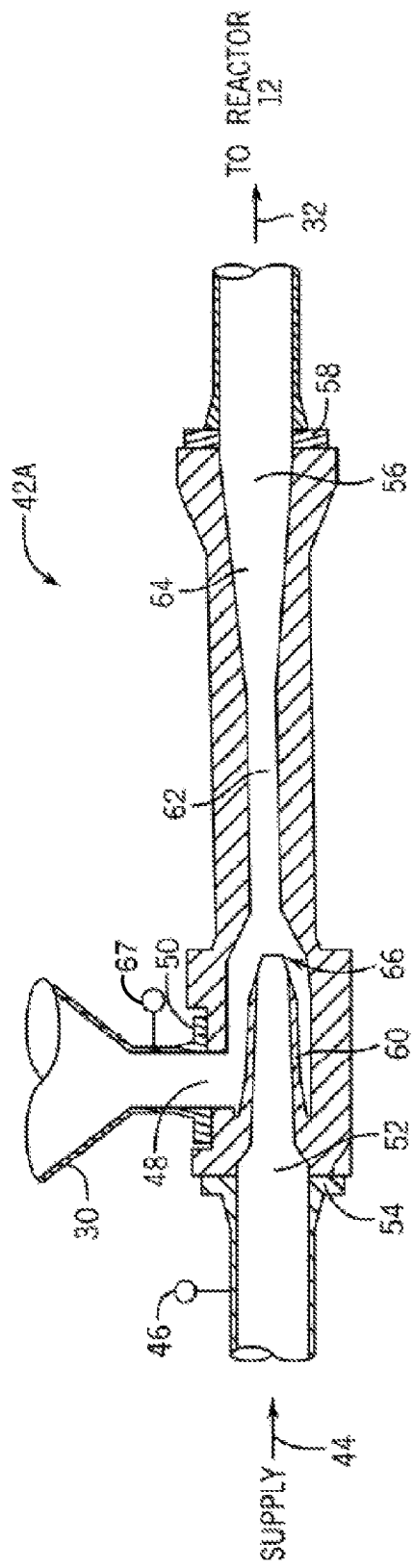
FIG. 2 is an exemplary motive device of an overhead solids recovery system of a gas phase reactor system in accordance with embodiments of the present techniques.

FIG. 2 is an exemplary ejector 42A installed as an example motive device 42 disposed at the bottoms solids discharge of the separation vessel 30 (e.g., cyclone) shown in FIG. 1. In this example, the ejector 42A receives polyolefin solids (e.g., primarily fines) from a bottom portion of the separation vessel 30, either directly or via a transfer conduit (not shown). The solids enter at a suction chamber 48 of the ejector 42A. In the illustrated embodiment, the ejector 42A is coupled to a bottom flange 50 of the separation vessel 30.

Motive fluid 44 is supplied to an inlet 52 of the ejector 42A to facilitate generation of a lower pressure in the ejector 42A to draw the incoming solids (and any residual loop gas) from the separation vessel 30 (e.g., cyclone) into the ejector 42A at the suction 48. The ejector 42A is coupled to a flange 54 of the motive fluid 44 supply conduit in this example. The solids (fines) and any residual loop gas exit the ejector 42A with motive fluid 44 in a return mixture 32 from the ejector discharge 56. The ejector 42A is coupled to a flange 58 of the solids (fines) mixture 32 return conduit, for instance. While the ejector 42A has been described as flanged, the ejector 42A may instead be screwed or welded in place, or employ other coupling means.

As for internals, the exemplary ejector 42A has a nozzle 60 in a converging section of the ejector 42A. Further, the ejector 42A has a throat 62 and a diverging section 64. In operation, the venturi effect, a particular case of Bernoulli's principle, may be utilized in the process of the ejector 42A. In particular, the incoming motive fluid 44 (supplied at an incoming pressure as indicated approximately by pressure device 46) flows through the nozzle 60 and may become a high-velocity jet at the throat 62, creating a low pressure at the discharge 66 of the nozzle 60 and downstream in the throat 62. The low pressure beneficially draws the suction solids (from the separation vessel 30) into the annulus or cavity around the nozzle 60.

The entering solids mix with the motive fluid 44 at the nozzle 60 exit (discharge 66) and in the throat 62. The pressure energy of the inlet motive fluid 44 may be converted to kinetic energy in the form of velocity head at the throat 62. As the motive fluid 44 expands downstream of the throat 62 in the divergent section 64, the kinetic energy may be converted back to pressure energy at the eductor 42A outlet in accordance with Bernoulli's principle, and the return mixture 32 of fines with motive fluid 44 driven to reactor 12. Other characterizations of the eductor 42A operation are applicable. In general, it is desirable to have a low pressure at the nozzle 60 discharge 66 and in the throat 62 to facilitate flow of solids from the separation vessel 30 into and through the ejector 42A to the reactor 12.

A high or inadequately low internal pressure at the nozzle 60 discharge 66 and in the throat 62 could result in accumulation of solids in the separation vessel 30 solids bottom discharge portion and in the annulus around the nozzle 60 in the ejector 42A, for example. To reduce such undesirable accumulation of solids, the mass flow rate and supply pressure of the motive fluid 44 may be adjusted to both reduce the pressure at the nozzle 60 exit (e.g., location indicated by reference numeral 66) and to give beneficial flow of the recovered solids (in return mixture 32) to the gas phase reactor 12. On the other hand, it should be noted that in certain examples, too much motive fluid 44 supply may adversely affect the pressure recovery at the discharge of the motive device and thus adversely affect return of the mixture 32 to the reactor 12.

To monitor the pressure performance of the eductor 42A, the pressure device 46 is utilized and a nozzle pressure drop equation used to calculate the pressure drop across the nozzle 60. An exemplary nozzle pressure drop equation is Pressure Drop=[Density/2]×[Flow Rate/(CA)]^2, where C is a nozzle flow coefficient and A is the cross section area of the nozzle. The density and the flow rate are of the motive fluid supply in the present context. Of course, other flow fluid equations may be used to determine pressure drop across a nozzle, such as the nozzle 60 in the converging section of the motive device 42.

Thus, the pressure drop across the ejector nozzle 60 may depend, in part, on the physical properties of the motive fluid 44 and the flow rate of the motive fluid 44. The pressure drop across the ejector nozzle 60 influences the pressure at the nozzle exit or discharge 66 and thus the pressure difference between the bottom portion of the separation vessel 30 and the nozzle discharge 66. Exemplary differential pressure values (between the bottom portion of the separation vessel 30 and the nozzle discharge 66) for an adequately functioning ejector 42A are in the range of 3-4 psi, for example. Other beneficial differential pressure values are applicable.

As for the nozzle 60 pressure drop characterization, the upstream pressure point may be the pressure indicated by the pressure device 46, and the downstream pressure point may be at the nozzle 60 exit or discharge 66. This downstream pressure value may be determined (e.g., via a control system) with this pressure drop calculation and the measured upstream pressure by the pressure device 46. The pressure at the downstream point (nozzle discharge 66) may be determined as the upstream pressure (as measured by pressure device 46) minus the calculated pressure drop (as calculated online with a pressure drop equation by the control system 40, for example). This determined downstream pressure may be the suction pressure of the motive device 42, and may be compared to the bottom pressure of the separation vessel 30 to give a value for the differential pressure (driving force for solids flow) between the separation vessel 30 and the motive device 42.

In operation, the control system 40 may calculate the aforementioned pressure drop (across the nozzle 60) and/or other pressure drops at other points across the ejector 42A (or eductor), as well as determine the differential pressure between the separation vessel 30 (e.g., bottom pressure) and the motive device 42 (e.g., suction pressure). In response to such pressure drop calculation(s) and differential pressure determination, the control system 40 may adjust (including automatically) the supply pressure and/or mass (or volumetric) flow rate, for example, of the incoming motive fluid 44 supply to the ejector 42A. The supply pressure or flow rate of the incoming motive fluid 44 may also be adjusted manually by an operator or engineer, for instance. Whether adjusted automatically or manually, the supply pressure and flow rate of the motive fluid 44 supply may be adjusted by altering operation of a compressor supplying the motive fluid 44, for example. Such adjustments may also be made by modulating an upstream control valve that affects the flow rate and/or pressure of the motive fluid 44 supply.

As indicated, various pressure drop positions and locations in the solids recovery system of the reactor overhead may be considered. In one example, a pressure drop is calculated (e.g., via control system 40) with a fluid flow (i.e., pressure drop) equation for a nozzle to give a calculated pressure differential between a measured upstream motive gas supply pressure (as measured and indicated by pressure device 46, or example) and the nozzle 60 discharge pressure 66 in the motive device 42. Exemplary values for this pressure drop may be 30-32 psi, for example. Of course, other values for this pressure drop may be implemented or realized.

A related differential pressure may be between the bottom portion or outlet separation vessel 30 (a calculated or measured pressure of the bottom portion of the cyclone) and the nozzle 60 discharge 66 in the motive device 42. The nozzle 60 discharge 66 pressure may be characterized as the suction pressure (or approximate suction pressure) of the motive device 42 in certain examples. The value of this nozzle 60 discharge 66 pressure may be given by the aforementioned nozzle pressure drop equation. As indicated, exemplary values for this differential pressure between the bottom portion of the separation vessel 30 versus the nozzle 60 discharge 66 pressure may 3-4 psi or other values.

In embodiments, the pressure of the bottom portion or bottom outlet of the separation vessel 30 may be measured by a pressure device 67 having a pressure sensor. However, due to concerns of fouling or plugging the tap of the pressure device or the pressure device 67 itself in certain configurations, the separation vessel 30 bottom pressure may be calculated. Such a calculated pressure may be based on a measured inlet pressure to the separation vessel 30 and the measured overall pressure drop through the separation vessel 30 (e.g., to the overhead of the separation vessel 30). In one example, the pressure drop from the separation vessel 30 into to the separation vessel 30 bottom outlet is estimated to be the measured separation vessel 30 inlet pressure minus one half of the measured separation vessel 30 overall pressure drop. Nevertheless, there are several techniques to give a value for the bottom pressure of the separation vessel 30, and it is this value that is compared to the suction pressure value in the motive device 42 to determine the differential pressure between the separation vessel 30 and the motive device 42. Moreover, in certain examples, the suction pressure of the motive device 42 may be determine and monitored without continued reference to pressure of the separation vessel 30. Such may be more likely with relatively more stable and consistent separation vessel pressures, for instance.

In certain embodiments, an approach is to first calculate the pressure drop of motive fluid supply 44 across the nozzle 60, and then subtract that calculated pressure drop from the measured pressure (by pressure device 46) of the motive fluid 44 supply to give the nozzle 60 discharge 66 pressure. Then, this nozzle 60 discharge 68 pressure value is subtracted from the calculated (or measured) value of the separation vessel 30 bottom pressure to give the value of the differential pressure (e.g., 3-4 psi) between the separation vessel 30 and the nozzle 60 discharge 66. The control system 40 may so determine and monitor this differential pressure between the separation vessel and the motive device 42 nozzle 60 discharge 66 to ensure an adequate driving force for the solids to exit the bottom outlet of the separation vessel 30 and enter the suction chamber 48 of the motive device 42.

If this differential pressure between the separation vessel 30 and the motive device 42 nozzle 60 discharge 66 is too low (for adequate flow of solids from the separation vessel 30 into the motive device 42), the supply pressure and/or flow rate of the motive fluid 44 to the motive device 42 may be increased. On the other hand, if this pressure differential between the separation vessel 30 and the motive device 42 nozzle 60 discharge 66 is too high, such as due to too low of a nozzle 60 discharge 66 pressure (motive device 42 suction pressure), the supply pressure or flow rate of the motive fluid 44 supply to the motive device 42 may be decreased, so to promote adequate pressure recovery in the diverging portion of the motive device 42 for sufficient driving force and flow of the return mixture 32 (FIG. 1) to the gas phase reactor 12.

Figure 3:
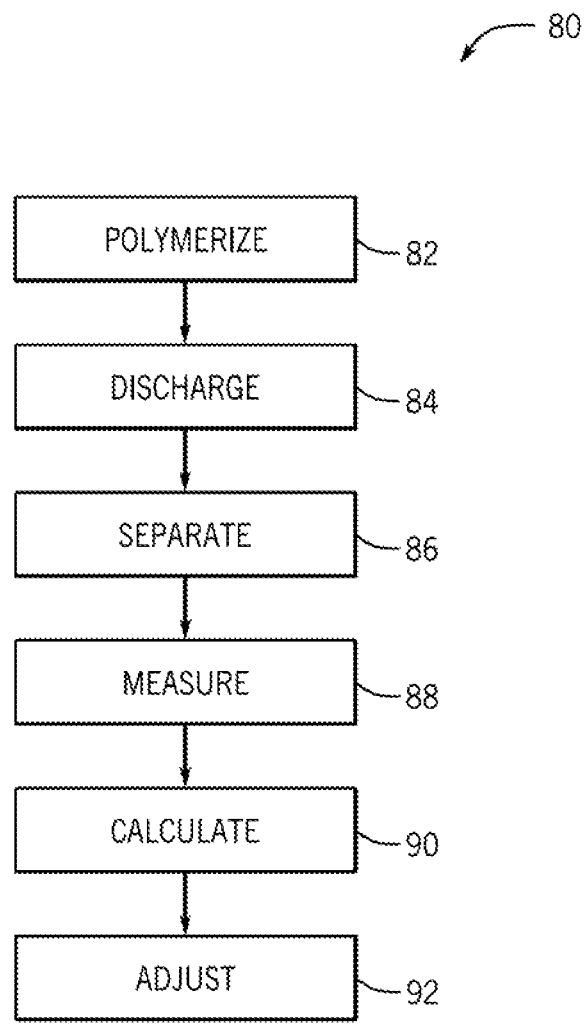
FIG. 3 is an exemplary method of operating a gas phase reactor system in accordance with embodiments of the present techniques.

FIG. 3 is an exemplary method 80 of operating a reactor system having a gas phase reactor and an overhead solids recovery system. In the gas phase reactor, olefin (e.g., ethylene) is polymerized (block 82) into a polyolefin (e.g., polyethylene) in the presence of a catalyst. A gas (e.g., fluidization/loop gas) is discharged (block 84) overhead from the gas phase reactor. The discharged gas typically has solids carryover (polyolefin and possibly catalyst) from the gas phase reactor. These solids may generally be polyolefin fines, i.e., polyolefin particles of relatively small diameter.

A reactor overhead system having a solids recovery system separates (block 86) the solids from the gas and returns the solids to the reactor. To do so, the solids recovery system employs a separation vessel (e.g., cyclone) to overhead discharge the gas to a loop gas circuit, for instance, and to bottom discharge the solids. A motive device (e.g., ejector, eductor, injector, jet pump, etc.) at or near the bottom solids discharge of the separation vessel facilitates return of the solids to the reactor. A motive fluid is supplied to the motive device to generate a low suction pressure in the motive device to beneficially draw the solids from the separation vessel. The motive fluid further drives the solids to the reactor (e.g., in a solids/fines return conduit) from the motive device. Thus, advantageously, the solids that are entrained or carryover in the overhead gas discharged from the reactor are recovered.

The motive fluid may be a dedicated fluid such as inert gas (e.g., nitrogen) and the like. The motive fluid may also be a slip stream of loop gas from the loop gas circuit, for example. Moreover, the motive fluid may be supplied via a dedicated compressor and/or via a compressor also used for other purposes, or a combination thereof. In one example, the motive fluid is a slipstream of loop gas taken from the discharge side of a loop gas compressor. This slipstream of loop gas is fed from the loop gas compressor to a dedicated motive fluid compressor for additional pressure increase prior to entry to the motive device.

The method 80 may include measuring (block 88) the pressure of the motive fluid supplied to solids recovery system such as to the motive device. This supply pressure may be measured via a pressure device having a pressure sensor. The pressure device may be disposed on a supply conduit of the motive fluid at or near the motive device, or on such a supply conduit further upstream of the motive device. The measured pressure value (of the motive fluid supply) may be indicated locally (e.g., as with a pressure gauge of the pressure device) and/or transmitted by the pressure device in an electronic signal to a control system.

The control system may calculate (block 90) a pressure drop in the solids recovery system. For example, to determine the suction pressure (at or near the discharge of a converging nozzle internal to the motive device, for instance) of the motive device and/or for other reasons, the control system may calculate (block 90) a pressure drop in or across the motive device. In one example, a pressure drop equation for a nozzle is employed by the control system to calculate the motive fluid pressure drop across an internal nozzle of the motive device. Other pressure drop or fluid flow equations may be employed by the control system. The control system may be programmed with the equation(s) employed.

Moreover, various locations for the upstream and downstream points of the pressure drop determination may be utilized. In certain embodiments, the upstream pressure point is the location at which the motive fluid supply pressure is measured by the aforementioned pressure device, and the downstream pressure point is at a discharge of an internal converging nozzle (before a diverging section) in the motive device. The nozzle discharge point may be related to or give the suction pressure value of the motive device. Other locations for the upstream and downstream pressures in the pressure drop determination may be set.

Again, the value of the downstream pressure (e.g., at or near the nozzle discharge internal to the motive device) of the pressure drop calculated may be or related to the suction pressure of the motive device. The control system may determine the suction pressure by subtracting the calculated pressure drop value from the measured upstream motive fluid supply pressure value (e.g., indicated or input to the control system from the pressure device measuring supply pressure). The control system may then compare this determined suction pressure to the separation vessel pressure (measured or calculated) to determine the differential pressure or driving force of solids from the separation vessel to the motive device. On the other hand, the control system may base control on the suction pressure without continued references to the separation vessel pressure.

In response to the calculated pressure drop(s) and any associated differential pressure determinations in the solids recovery system, the control system may adjust (block 92) the motive fluid supply to the solids recovery system such as to a motive device of the solids recovery system. In examples, the operation (e.g., pressure, flow rate, etc.) of the motive fluid supply is adjusted (block 92) in response to a calculated pressure drop across an internal portion (nozzle, nozzle and throat, etc.) of the motive device and/or in response to a calculated or determined internal suction pressure of the motive device. A desired pressure drop value and low suction pressure may beneficially facilitate the draw of solids from the separation vessel into and through the motive device, and thus reduce the potential for fouling or plugging of the separation vessel solids outlet and the motive device. The control system may determine (block 90) and monitor the differential pressure between the separation vessel and motive device, and this determined or calculated differential pressure considered in adjusting (block 92) operation of the motive fluid supply.

Again, as shown in the illustrated embodiment of FIG. 1, the control system 40 (e.g., DCS) facilitates control of the polyolefin reactor system 10. As indicated above, such a control system 40 may interface with equipment, valves, actuators, instrumentation including sensors and transmitters, and so forth, in the reactor system 10. Such equipment may include pumps, compressors, reactors, vessels, and so on. The control system 40 may include the appropriate hardware (e.g., processor, memory, etc.), software logic including code (e.g., stored on the memory) executable by the processor, to facilitate measurement and control of process variables, to perform calculations including related to measured data and so on, to implement control schemes including adjustment of operating conditions. Such instructions may set actuator positions and the open/close position of valves, the settings of compressors, and the like.

Figure 4:
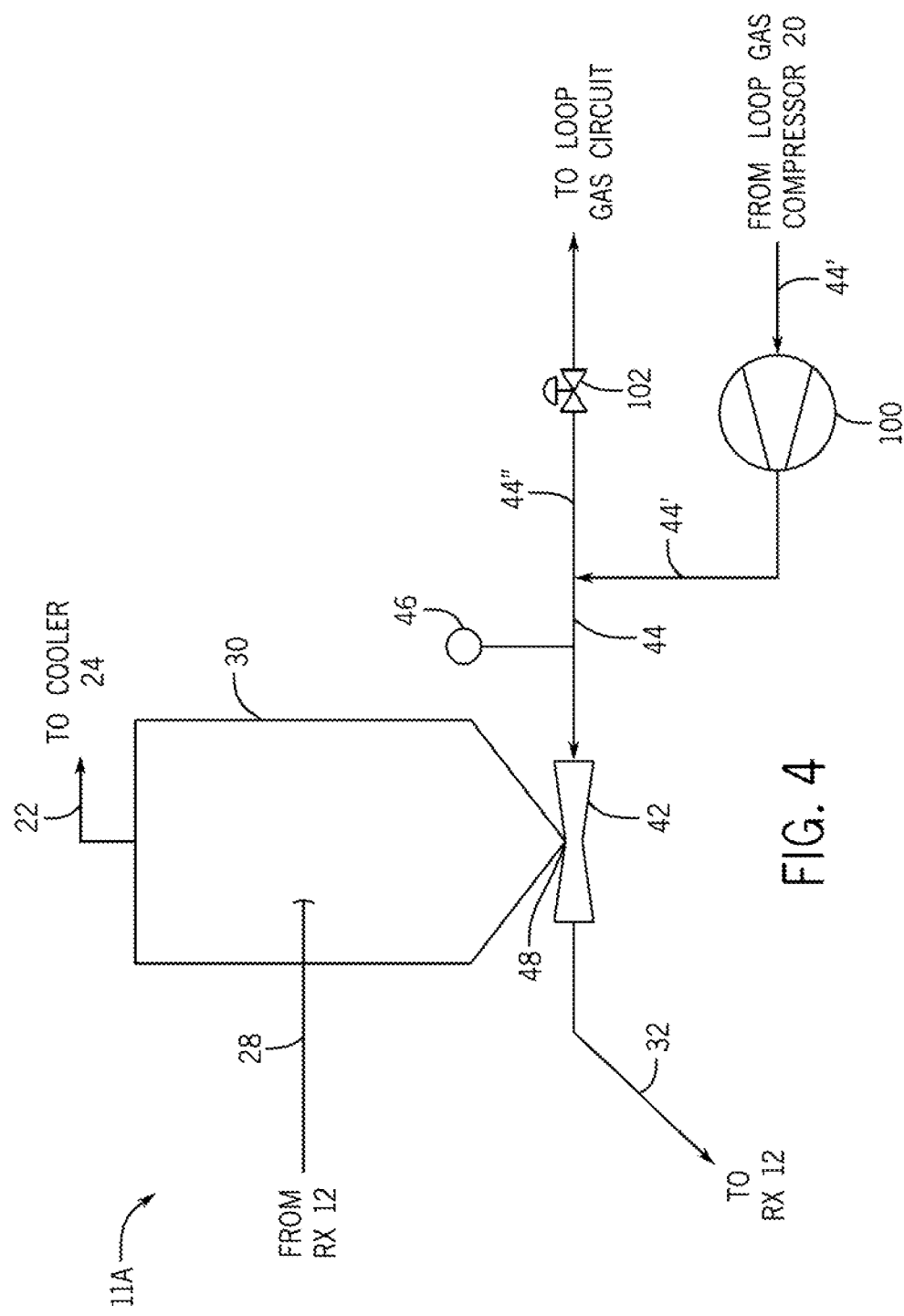
FIG. 4 is an exemplary overhead solids recovery system of a gas phase reactor system in accordance with embodiments of the present techniques.

FIG. 4 is an exemplary solids recovery system 11A having a separation vessel 30 (e.g., cyclone) and a motive device 42 (e.g., ejector or eductor). As discussed with respect to FIG. 1, the separation vessel 30 receives the discharge mixture 28 of reactor overhead gas (loop gas) and entrained solids discharged overhead from the gas phase reactor 12. The separation vessel 30 then discharges overhead from the separation vessel 30 the loop gas 22 substantially free (or at least a reduced amount) of solids. In certain embodiments, this loop gas 22 from the separation vessel overhead is sent to a heat exchanger 34 (cooler) in a loop gas 22 circuit. The separated solids discharge from a bottom portion of the separation vessel 30 to a suction inlet 48 of the motive device 42. The solids (e.g., fines) are returned in a return mixture 32 with motive fluid 44 to the gas phase reactor 12 from the motive device 42 discharge.

As previously indicated, a motive fluid 44 is supplied to the motive device 42 to generate a low suction pressure in the motive device 42 to draw solids from the separation vessel 30 into the motive device 42, and to provide a driving force for the transfer (return) of the return mixture 32 having solids (fines) and motive fluid 44 to the reactor 12. This return mixture 32 with fines so returned to the reactor 12 may also include a relatively small amount of loop gas discharged with solids from the separation vessel 30 bottom outlet. The supply pressure of the motive fluid 44 to the motive device 42 may be measured with a pressure device 46 having a pressure element or pressure sensor.

A supply configuration for the motive fluid 44 supply is depicted in FIG. 4. It should be emphasized, however, that many other configurations for motive fluid 44 supply are contemplated in accordance with the present techniques. In the illustrated embodiment, a motive fluid 44' is taken as a slip stream of loop gas 22 from the discharge of the loop gas compressor 20 (in FIG. 1) and fed to a motive fluid supply compressor 100. The motive fluid 44' discharge stream from the motive fluid supply compressor 100 is fed to the motive device 42 as motive fluid 44, but with a portion 44" of the discharged motive fluid 44' recycled back to the main loop gas 22 circuit via a control valve 102. Such a control scheme employing the recycle control valve 102 may modulate the pressure and flow rate of the motive fluid 44 supplied to the motive device 42. Indeed, the recycle control valve 42 may be characterized as a pressure control valve and/or flow control valve. The recycled motive fluid 44"(loop gas) may be returned to the loop gas 22 circuit upstream or downstream of the heat exchanger 34 (cooler), for example.

Further, the settings of the compressor 100 may be altered or modulated to adjust the pressure and/or flow rate of the motive fluid 44 supply to the motive device 42. In one example, a substantially constant flow rate of motive fluid 44 is maintained through the compressor 100, and the discharge pressure of the motive fluid from the compressor 100 is modulated.

Lastly, with respect to FIGS. 1-4, the solids recovery system 11 may include a plurality of separation vessels 30 (and associated motive devices 42) in series and/or parallel. For example, the solids recovery system 11 may include two separation vessels 30 (e.g., cyclones) operating in parallel or series to remove and recover solids from the loop gas/solids discharge mixture 28. Two motive devices 42 (e.g., ejector, eductor, etc.) may be disposed at the bottom solids discharge of the two separation vessels 30, respectively. Furthermore, each motive device 42 may have a respective motive fluid 44 supply and respective pressure device 46. Again, the solids in the discharge mixture 28 may be separated and return to the reactor 12.

Moreover, a unique vertical design of the motive device 42B may be employed in accordance with embodiments of the present techniques. In particular, the motive device 42B may include features to give a substantially vertical orientation when installed and that may reduce the potential for fouling or plugging of the motive device 42B and of the upstream solids discharge outlet of the separation vessel 30. In certain examples, as discussed below with respect to FIG. 5, the motive device 42B is configured such that the solids (typically primarily polyolefin fines) discharging from the bottom outlet of the separation vessel 30 (e.g., cyclone) enters along a vertical centerline of a suction chamber of the vertically-installed motive device 42B. The motive fluid or motive gas may enter from the side into an annulus around the suction chamber, for example. In all, as explained more below, such a configuration may eliminate or reduce areas for solids accumulation that could lead to fouling or plugging of the motive device 42B.

Figure 5:
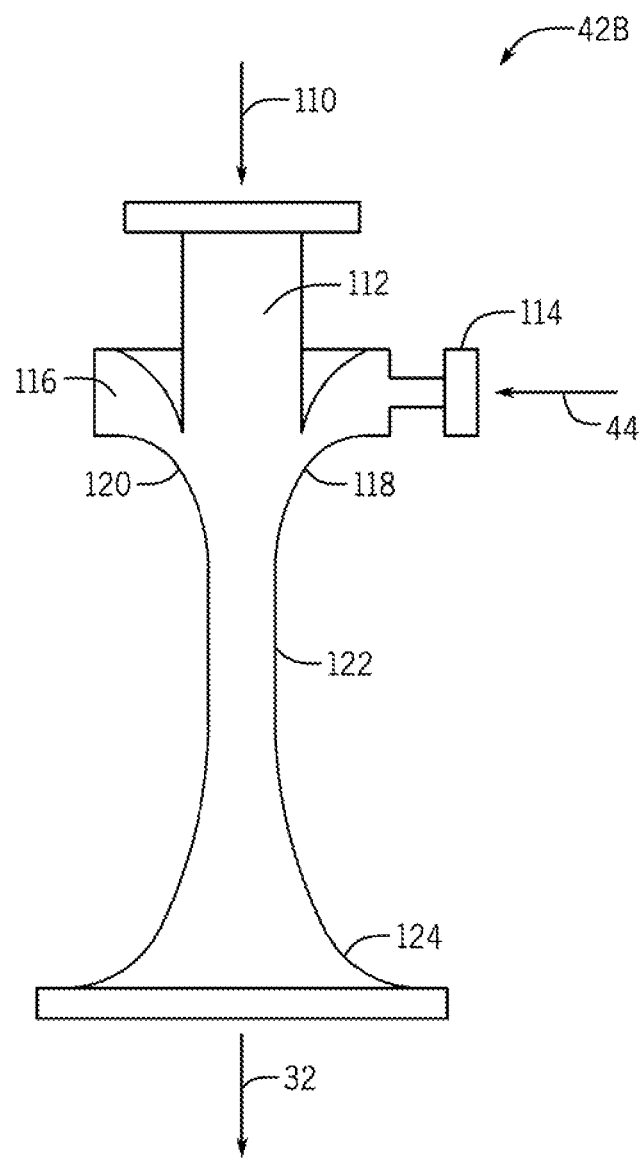
FIG. 5 is an exemplary vertical motive device of an overhead solids recovery system of a gas phase reactor system in accordance with embodiments of the present techniques.

FIG. 5 is an exemplary motive device 42B for a vertical installation and vertical operation. In this example, the motive device 42B is an ejector (or eductor). The motive device 42B is configured for solids 110 (typically primarily polyolefin fines) to enter from the separation vessel 30 generally disposed above the motive device 42B. As depicted, the solids 110 enter a suction chamber 112 of the motive device 42B. Ultimately, the solids 110 discharge in a return mixture 32 with motive fluid 44 from the motive device 42B and are returned to the gas phase reactor 12.

The motive device 42B is configured for motive fluid 44 to enter a side nozzle 114 and beneficially distribute around an annular region 116. The annular region 116 is formed between the circumference of the motive device 42B and the exterior of the internal suction chamber 112. Advantageously, such a motive fluid 44 distribution and also the vertical orientation (with gravity) may significantly reduce accumulation of solids around the suction chamber 112 that could leading to fouling or plugging.

A motive fluid 44 desired acceleration may be experienced in a converging section 118. Further, the converging section 118 may be configured with a curvature 120 to reduce boundary layer separation of motive fluid 44 from the internal surface of the outside wall of the motive device 421. Thus, accumulation or adhering (fouling) of solids 110 to the wall may be reduced. A throat 122 is provided as a mixing length to accelerate solids. Lastly, a diffuser or diverging section 124 may provide for pressure recovery. In all, the vertical motive device 42B is configured to reduce the potential for fouling or plugging and the back-up of solids into the separation vessel 30 due to restriction or loss of low suction pressure caused by fouling.

III. Summary

In summary, embodiments of the present techniques provide for a method of operating a reactor system having a gas phase reactor such as a fluidized-bed gas phase reactor. The method includes polymerizing olefin in the gas phase reactor into a polyolefin, discharging a discharge mixture, e.g., overhead from the gas phase reactor, the discharge mixture having gas (e.g., loop gas to be recirculated to the rector in a loop gas circuit) and entrained solids (to be returned in a return conduit to the gas phase reactor). The method includes: separating the entrained solids from the gas via a solids recovery system; measuring a pressure of a motive fluid supply to the solids recovery system; calculating a pressure drop (e.g., in a motive device) in the solids recovery system; and adjusting the motive fluid supply to the solids recovery system in response to measuring the pressure and calculating the pressure drop. The solids recovery system may include (1) a separation vessel (e.g., cyclone) to separate the entrained solids from the discharge mixture; and (2) a vertical motive device and/or horizontal motive device. The motive device may be disposed at or near a bottoms discharge of the separation vessel, and receive the entrained solids from the separation vessel and facilitate return of the entrained solids to the gas phase reactor.

The calculated pressure drop may be the pressure drop or differential between the measured pressure of the motive fluid supply and a pressure (e.g., suction pressure) in a motive device (e.g., ejector, eductor, etc.) of the solids recovery system. The calculated pressure drop may be across a nozzle of a motive device. Further, the calculated pressure drop may give a suction pressure value of a motive device in the solids recovery system. Adjusting the motive fluid supply in response to the measured pressure and calculated pressure drop may be performed online automatically via a control system. The adjusting may include adjusting a supply pressure and/or flow rate of the motive fluid supply. The adjusting may take into account the differential pressure between the separation vessel and the suction pressure of the motive device.

Other embodiments may involve a method of operating a gas phase reactor, the method including polymerizing in the gas phase reactor an olefin (e.g., ethylene) into a polyolefin (e.g., polyethylene), and discharging a reactor overhead gas from the reactor, the overhead gas plus entrained solids from the reactor (i.e., a discharge mixture of overhead gas and solids). The method includes separating the solids from the overhead gas via a solids recovery system having a separation vessel (e.g., cyclone) and a vertical motive device (e.g., vertical ejector). The separation vessel separates the solids from the overhead gas of the discharge mixture. The vertical motive device receives the separated solids from the separation vessel and facilitates return of the solids to the gas phase reactor. The exemplary method may include performing, via a control system, a fluid flow calculation of the solids recovery system.

Yet other embodiments include a polyolefin reactor system having: a gas phase reactor to polymerize olefin into a polyolefin; a solids recovery system to separate solids from overhead gas discharged from the gas phase reactor, wherein the solids recovery system includes a separation vessel, a motive device (e.g., vertical motive device, horizontal motive device, etc.), and a pressure device to measure pressure of a motive fluid supply to the motive device; and a control system configured to calculate a pressure drop in the solids recovery system and to adjust operation of the motive fluid supply in response to the measured pressure and the calculated pressure drop. The pressure drop may be a pressure drop between the measured pressure of the motive fluid supply and a suction pressure of the motive device. The control system may be configured to adjust a pressure of the motive fluid supply and/or flow rate of the motive fluid supply, in response to the measured pressure and the calculated pressure drop. The control system may compare the suction pressure value to the bottom pressure of the separation vessel to facilitate adequate pressure differential in making adjustments of the motive fluid supply.

Lastly, certain embodiments include a polyolefin reactor system having: a gas phase reactor configured to polymerize olefin (e.g., ethylene) into a polyolefin (e.g., polyethylene); and a solids recovery system to separate solids from overhead gas discharged from the gas phase reactor and to return the solids to the gas phase reactor, wherein the solids recovery system has a separation vessel (e.g., cyclone) and a motive device (e.g., ejector) that is substantially vertical. In examples, the motive device is configured to receive the solids from the separation vessel along a vertical centerline of a suction chamber of the motive device, and wherein the motive device is configured to receive a motive fluid at a side of the motive device into an annulus around an outside of the suction chamber. A converging section of the motive device may have a curved surface to reduce boundary layer separation of motive fluid.

What is claimed is:

1. A method of operating a gas phase reactor system, the method comprising:
   polymerizing olefin in a gas phase reactor into a polyolefin;
   discharging a discharge mixture from the gas phase reactor, the discharge mixture comprising gas and solids entrained in the gas from the gas phase reactor;
   separating the solids from the discharge mixture via a solids recovery system;
   measuring a pressure of a motive fluid supply to the solids recovery system;
   calculating a pressure drop in the solids recovery system; and
   adjusting the motive fluid supply in response to measuring the pressure and calculating the pressure drop.

2. The method of claim 1, wherein adjusting the motive fluid supply is performed online automatically via a control system.

3. The method of claim 1, wherein the solids recovery system comprises:
   a separation vessel configured to separate the solids from the discharge mixture; and
   a vertical motive device disposed at or near a bottoms discharge of the separation vessel and configured to receive the solids from the separation vessel and to facilitate return of the solids to the gas phase reactor.

4. The method of claim 1, wherein the solids recovery system comprises:
   a separation vessel configured to separate the solids from the gas stream; and
   a horizontal motive device disposed at or near a bottom discharge of the separation vessel and configured to receive the solids from the separation vessel and to facilitate return of the solids to the gas phase reactor.

5. The method of claim 1, wherein the pressure drop comprises a pressure drop between the pressure of the motive fluid supply and a pressure in a motive device of the solids recovery system.

6. The method of claim 1, wherein the pressure drop comprises a pressure drop between the pressure of the motive fluid supply and a suction pressure of a motive device of the solids recovery system.

7. The method of claim 1, wherein calculating the pressure drop comprises calculating the pressure in a motive device of the solids recovery system.

8. The method of claim 1, wherein calculating the pressure drop comprises calculating the pressure drop across a nozzle of a motive device of the solids recovery system.

9. The method of claim 1, wherein calculating the pressure drop gives a suction pressure value of a motive device in the solids recovery system.

10. The method of claim 1, wherein calculating the pressure drop facilitates determination of a differential pressure between a pressure in a separation vessel of the solids recovery system and a pressure in a motive device of the solids recovery system.

11. The method of claim 1, wherein the discharge mixture discharges overhead from the gas phase reactor.

12. The method of claim 1, wherein the gas phase reactor comprises a fluidized-bed gas phase reactor, and wherein the discharge mixture comprises loop gas recirculated to the gas phase reactor in a loop gas circuit.

13. The method of claim 1, wherein adjusting comprises adjusting at least one of a supply pressure of the motive fluid supply or a flow rate of the motive fluid supply.

14. A method of operating a reactor system having a gas phase reactor, the method comprising:
   polymerizing olefin in the gas phase reactor into a polyolefin;
   discharging a discharge mixture from the gas phase reactor, the discharge mixture comprising an overhead gas and solids entrained in the overhead gas from the gas phase reactor;
   separating the solids from the overhead gas via a solids recovery system comprising a separation vessel and a vertical motive device;
   performing, via a control system, a fluid flow calculation of the solids recovery system; and
   in response to the fluid flow calculation, adjusting, via the control system, motive fluid supply to the solids recovery system.

15. The method of claim 14, wherein:
   the separation vessel is configured to separate the solids from the discharge mixture; and
   the vertical motive device is configured to receive the solids from the separation vessel and facilitate return of the solids to the gas phase reactor.

16. The method of claim 14, wherein:
   the separation vessel comprises a cyclone; and
   the vertical motive device comprises a vertical ejector.

17. The method of claim 14, wherein:
   the olefin comprises ethylene; and
   the polyolefin comprises polyethylene.

18. A polyolefin reactor system comprising:
   a gas phase reactor configured to polymerize olefin into a polyolefin;
   a solids recovery system configured to separate solids from overhead gas discharged from the gas phase reactor, wherein the solids recovery system comprises a separation vessel, a motive device, and a pressure device configured to measure pressure of a motive fluid supply to the motive device; and
   a control system configured to calculate a pressure drop in the solids recovery system and to adjust operation of the motive fluid supply in response to the measured pressure and the calculated pressure drop.

19. The polyolefin reactor system of claim 18, wherein the motive device comprises a vertical motive device.

20. The polyolefin reactor system of claim 18, wherein the motive device comprises a horizontal motive device.

21. The polyolefin reactor system of claim 18, wherein the pressure drop comprises a pressure drop between the measured pressure of the motive fluid supply and a suction pressure of the motive device.

22. The polyolefin reactor system of claim 18, wherein the control system is configured to adjust a pressure of the motive fluid supply in response to the measured pressure and the calculated pressure drop.

23. The polyolefin reactor system of claim 18, wherein the control system is configured to adjust a flow rate of the motive fluid supply in response to the measured pressure and the calculated pressure drop.

24. A polyolefin reactor system comprising:
  a gas phase reactor configured to polymerize olefin into a polyolefin;
  a solids recovery system configured to separate solids from overhead gas discharged from the gas phase reactor and to return the solids to the gas phase reactor, the solids recovery system comprising a separation vessel and a motive device that is substantially vertical; and
  a control system configured to perform a fluid flow calculation of the solids recovery system and to adjust motive fluid supply to the solids recovery system in response to the fluid flow calculation.

25. The polyolefin reactor system of claim 24, wherein the separation vessel comprises a cyclone configured to separate the solids from the overhead gas.

26. The polyolefin reactor system of claim 24, wherein the motive device is configured to receive the solids from the separation vessel along a vertical centerline of a suction chamber of the motive device, and wherein the motive device is configured to receive a motive fluid at a side of the motive device into an annulus around an outside of the suction chamber.

27. The polyolefin reactor system of claim 24, wherein a converging section of the motive device comprises a curved surface to reduce boundary layer separation of motive fluid.

28. The polyolefin reactor system of claim 24, wherein the olefin comprises ethylene, and the polyolefin comprises polyethylene.

* * * * *